United States Patent
Liao et al.

(10) Patent No.: US 10,748,089 B2
(45) Date of Patent: Aug. 18, 2020

(54) METHOD AND SYSTEM FOR AUTOMATIC EVALUATION OF ROBUSTNESS AND DISRUPTION MANAGEMENT FOR COMMERCIAL AIRLINE FLIGHT OPERATIONS

(71) Applicant: General Electric Company, Schenectady, NY (US)

(72) Inventors: Hongwei Liao, Niskayuna, NY (US); David So Keung Chan, Niskayuna, NY (US); James Kenneth Aragones, Clifton Park, NY (US); Mark Thomas Harrington, Cheltenham (GB)

(73) Assignee: General Electric Company, Schenectady, NY (US)

(*) Notice: Subject to any disclaimer, the term of this patent is extended or adjusted under 35 U.S.C. 154(b) by 1192 days.

(21) Appl. No.: 14/582,602

(22) Filed: Dec. 24, 2014

(65) Prior Publication Data

US 2016/0189066 A1    Jun. 30, 2016

(51) Int. Cl.
*G06Q 10/02* (2012.01)
*G06Q 10/06* (2012.01)
(Continued)

(52) U.S. Cl.
CPC ........... *G06Q 10/025* (2013.01); *G06Q 10/06* (2013.01); *G06Q 50/14* (2013.01); *G06N 20/20* (2019.01)

(58) Field of Classification Search
CPC ...... G06Q 10/025; G06Q 10/06; G06Q 50/14; G06N 20/00; G06N 10/00
See application file for complete search history.

(56) References Cited

U.S. PATENT DOCUMENTS 6,134,500 A    10/2000  Tang et al.
6,314,361 B1   11/2001  Yu et al.
(Continued)

FOREIGN PATENT DOCUMENTS

CN    101582203 A    11/2009
CN    201510367316 A    6/2015
(Continued)

OTHER PUBLICATIONS

Chiraphadhanakul et al. "Robust Flight Schedules through slack Re-Allocation." EURO Journal on Transportation and Logistics 2, No. 4 (May 17, 2013): 277-306 (Year: 2013).*
(Continued)

*Primary Examiner* — George Chen
(74) *Attorney, Agent, or Firm* — Buckley, Maschoff & Talwalkar LLC (57) ABSTRACT

A method, medium, and system to receive a planned flight schedule and an actual flight schedule; determine root cause disturbances for the actual flight schedule based on the planned flight schedule and the actual flight schedule; evaluate a robustness of the planned flight schedule based on an execution of a simulation-based model to generate a set of quantitative metrics for the planned flight schedule; generate a record of the root cause disturbances and a record of the set of quantitative metrics for the planned flight plan; evaluate a robustness of a test flight schedule based on an execution of the simulation-based model and the determined root cause disturbances applied to the simulation-based model to generate a set of quantitative metrics for the test flight schedule; and generate a record of the set of quantitative metrics for the test flight plan.

10 Claims, 5 Drawing Sheets

(51) Int. Cl.
    *G06Q 50/14*     (2012.01)
    *G06N 20/20*     (2019.01)

(56)            References Cited

U.S. PATENT DOCUMENTS 6,721,714 B1*   4/2004  Baiada .............. G06Q 10/02
                                                    705/7.13
    7,085,726 B1    8/2006  Galperin et al.
    7,340,405 B1    3/2008  Guenther et al.
    7,668,744 B2    2/2010  Tiourine et al.
    7,725,337 B2    5/2010  Chu et al.
    7,848,944 B1   12/2010  Anbil
    8,050,936 B1   11/2011  Jamotta et al.
    8,117,007 B2    2/2012  Yitbarek et al.
    8,340,854 B2   12/2012  Doulatshahi et al.
    8,554,457 B2   10/2013  White et al.
    8,594,917 B2   11/2013  Sawhill et al.
    8,700,440 B1*   4/2014  Ande ................ G06Q 50/30
                                                    705/7.22
    8,744,902 B2    6/2014  Nguyen et al.
 2003/0004780 A1    1/2003  Smith et al.
 2004/0039613 A1*   2/2004  Maycotte ........... G06Q 10/02
                                                    705/5
 2005/0065842 A1    3/2005  Summers
 2005/0071206 A1    3/2005  Berg
 2007/0214033 A1    9/2007  Miller
 2007/0219833 A1    9/2007  Trautman
 2009/0276250 A1   11/2009  King et al.
 2011/0246000 A1   10/2011  Shavit
 2012/0053916 A1    3/2012  Tzidon
 2013/0117057 A1*   5/2013  Van Moltke ..... G06Q 10/06311
                                                    705/7.13
 2013/0138332 A1    5/2013  Johnson et al.
 2013/0226373 A1*   8/2013  Bollapragada ...... G08G 5/0039
                                                    701/3
 2014/0081569 A1    3/2014  Agrawal et al.
 2014/0257900 A1    9/2014  Jacobs et al.

FOREIGN PATENT DOCUMENTS

EP         1258823 A2     11/2002
    JP       H08-61974 A       3/1996
    JP      H11-306480 A      11/1999
    JP      2001-307300 A     11/2001
    JP       2002329158 A     11/2002
    JP       2009527857 A      7/2009
    JP       2011170502 A      9/2011
    JP       2013186717 A      9/2013
    JP       2014029661 A      2/2014
    JP       2014041475 A      3/2014

OTHER PUBLICATIONS

Reiners, Torsten et al., "Integrated Aircraft Scheduling Problem: An Auto-Adapting Algorithm to Find Robust Aircraft Assignments for Large Flight Plans", System Science (HICSS), 2012 45th Hawaii International Conference on, IEEE Xplore, DOI:10.1109/HICSS. 2012.330, Conference Location: Maui, HI, Jan. 4-7, 2012 (pp. 1267-1276, 10 total pages).

Chiraphadhanakul, Virot et al., "Robust Flight Schedules through Slack Re-Allocation". AGIFORS 51st Annual Symposium, 2011, 30pgs.

Lan, Shan et al., "Planning for Robust Airline Operations: Optimizing Aircraft Routings and Flight Departure Times to Minimize Passenger Disruptions", Transportation Science, vol. 40, No. 1, ISSN: 0041-1655; EISSN: 1526-447/06/4001/0015, DOI: 10.1287/trsc.1050.0134, Feb. 2006, (pp. 15-28, 14 total pages).

Haerne et al., "Airline Performance Modelling to Support Schedule Development: An Application Case Study", Proceedings of the 1988 Winter Simulation Conference, pp. 800-806, Dec. 12, 1988.

Wieland et al., "Parallel Simulation for Aviation Applications", Proceedings of the 1998 Winter Simulation Conference, vol. No. 02, pp. 1191-1198, Dec. 13, 1998.

U.S. Non-Final Office Action issued in connection with Related U.S. Appl. No. 14/593,578 dated Apr. 7, 2016.

European Search Report and Opinion issued in connection with Related EP Application No. 15200057.6 dated Apr. 14, 2016.

European Search Report and Opinion issued in connection with corresponding EP Application No. 15198758.3 dated Apr. 26, 2016.

Japanese Search Report issued in connection with related JP Application No. 2015-245792 dated Feb. 24, 2017.

Notification of Reasons for Refusal issued in connection with related JP Application No. 2015-245792 dated Mar. 21, 2017.

Non-Final Rejection towards related U.S. Appl. No. 14/593,578 dated Apr. 13, 2017.

Non-Final Rejection towards related U.S. Appl. No. 14/582,523 dated Apr. 20, 2017.

Unofficial English Translation of Japanese Search Report issued in connection with Related JP Application No. 2015252724 dated Dec. 15, 2016.

Unofficial English Translation of Japanese Office Action issued in connection with Related JP Application No. 2015252724 dated Jan. 17, 2017.

Ageeva et al., "MIT ICAT Approaches to Incorporating Robustness Into Airline Scheduling" MIT International Center for Air Transportation, Department of Aeronautics & Astronautics, pp. 1-94, Aug. 31, 2000.

Weide et al., "An Iterative Approach to Robust and Integrated Aircraft Routing and Crew Scheduling", Computer & Operations Research, vol. No. 37, Issue No. 5, pp. 833-844, May 1, 2010.

European Search Report and Opinion issued in connection with Related EP Application No. 16150605.0 dated Jun. 3, 2016.

Liao, et al., filed Dec. 24, 2014, U.S. Appl. No. 14/582,523.

Liao, et al., filed Jan. 9, 2015, U.S. Appl. No. 14/593,578.

Reiners T et al., "Integrated Aircraft Scheduling Problem: An Auto-Adapting Algorithm to Find Robust Aircraft Assignments for Large Flight Plans", System Science (HICSS), 2012 45th Hawaii International Conference on, IEEE Xplore, pp. 1267-1276; Conference Location: Maui, HI, Jan. 4-7, 2012.

Chiraphadhanakul et al., "Robust flight schedules through slack re-allocation". AGIFORS 51st Annual Symposium, 2011.

Lan et al., "Planning for Robust Airline Operations: Optimizing Aircraft Routings and Flight Departure Times to Minimize Passenger Disruptions", Transportation Science, vol. 40, No. 1, pp. 15-28, Feb. 2006.

English translation of Chinese Office Action dated Feb. 6, 2020 for Chinese Patent Application No. 201510983029 9 pp.

* cited by examiner

```
┌─────────────────────────────────────────────────────────────┐
│  RECEIVE A PLANNED FLIGHT SCHEDULE INCLUDING                │
│  FLIGHT DETAILS ASSOCIATED WITH EACH FLIGHT OF              │
│       THE PLANNED FLIGHT SCHEDULE              205          │
└─────────────────────────────────────────────────────────────┘
                          │
                          ▼
┌─────────────────────────────────────────────────────────────┐
│  RECEIVE AN ACTUAL FLIGHT SCHEDULE INCLUDING FLIGHT DETAILS │
│  ASSOCIATED WITH EACH FLIGHT OF THE ACTUAL FLIGHT SCHEDULE  │
│                                                  210        │
└─────────────────────────────────────────────────────────────┘
                          │
                          ▼
┌─────────────────────────────────────────────────────────────┐
│  DETERMINE ROOT CAUSE DISTURBANCES FOR THE ACTUAL FLIGHT    │
│       SCHEDULE BASED ON THE PLANNED FLIGHT                  │
│    SCHEDULE AND THE ACTUAL FLIGHT SCHEDULE      215         │
└─────────────────────────────────────────────────────────────┘
                          │
                          ▼
┌─────────────────────────────────────────────────────────────┐
│       EVALUATE A ROBUSTNESS OF THE PLANNED FLIGHT           │
│  SCHEDULE BASED ON AN EXECUTION OF A SIMULATION-BASED MODEL │
│      TO GENERATE A SET OF QUANTITATIVE METRICS              │
│           FOR THE PLANNED FLIGHT SCHEDULE        220        │
└─────────────────────────────────────────────────────────────┘
                          │
                          ▼
┌─────────────────────────────────────────────────────────────┐
│   GENERATE A RECORD OF THE ROOT CAUSE DISTURBANCES AND A    │
│   RECORD OF THE SET OF QUANTITATIVE METRICS FOR THE PLANNED │
│                   FLIGHT PLAN                    225        │
└─────────────────────────────────────────────────────────────┘
                          │
         ┌────────────────┘
         │                ▼
┌─────────────────────────────────────────────────────────────┐
│  EVALUATE A ROBUSTNESS OF A TEST FLIGHT SCHEDULE BASED ON AN│
│   EXECUTION OF THE SIMULATION-BASED MODEL AND THE DETERMINED│
│   ROOT CAUSE DISTURBANCES APPLIED TO THE SIMULATION-BASED   │
│  MODEL TO GENERATE A SET OF QUANTITATIVE METRICS FOR THE TEST│
│                  FLIGHT SCHEDULE                 230        │
└─────────────────────────────────────────────────────────────┘
                          │
                          ▼
┌─────────────────────────────────────────────────────────────┐
│  GENERATE A RECORD OF THE SET OF QUANTITATIVE METRICS       │
│              FOR THE TEST FLIGHT PLAN                       │
│                                                  235        │
└─────────────────────────────────────────────────────────────┘
                          │
                          ▼
```

METHOD AND SYSTEM FOR AUTOMATIC EVALUATION OF ROBUSTNESS AND DISRUPTION MANAGEMENT FOR COMMERCIAL AIRLINE FLIGHT OPERATIONS

BACKGROUND

Airline traffic network planning may typically happen many months in advance of an anticipated usage of an airline schedule produced by such planning. On the other hand, an evaluation of a robustness of an airline schedule is typically done near the actual execution of the schedule (i.e., near or on the day of the flights comprising the schedule). Sometimes, airlines do not even know how robust their schedule is, nor do they know how to quantify and evaluate the robustness of their schedule. The robustness of schedule may only be known to them after the schedule has been operated (i.e., after it has been flown). Given the time, effort, and resources devoted to flight scheduling planning and optimization and the importance of the flight schedule to an airline, effective and accurate means for determining a robustness of an airline schedule.

Therefore, it would be desirable to design an apparatus and method that provides an automatic evaluation of a robustness of operations for an airline.

SUMMARY

According to some embodiments, a method and system is provided for evaluating and validating a robustness of airline flight schedules or plans. The system includes a model-based simulation and analysis module to evaluate and validate a robustness of flight schedules, including actual test schedules and proposed test schedules. In some aspects, test schedules may be automatically generated to cover a desired range of airline operation possibilities.

A technical effect of some embodiments of the present disclosure is an efficient technique and system for evaluating and validating a robustness of airline flight schedules using quantitative metrics. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

The following description is provided to enable any person in the art to make and use the described embodiments. Various modifications, however, will remain readily apparent to those in the art.

Figure 1:
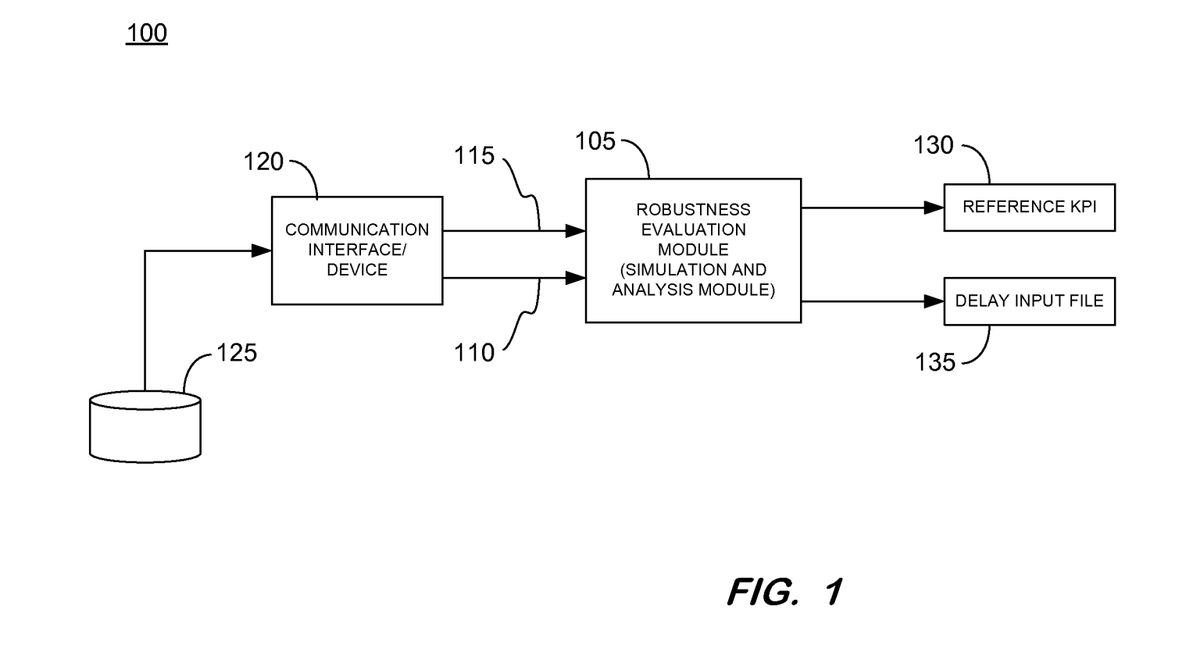
FIG. 1 is an illustrative depiction of a system, according to some embodiments.

FIG. 1 is a block diagram of a simulation-based validation system 100 for airline flight operations, according to some embodiments. System 100 includes a robustness evaluation module 105. Robustness evaluation module 105 may primarily provide a mechanism to evaluate the robustness of a flight schedule based on flight schedule inputs and the flight disturbances applied to those flight schedules to generate a quantitative measure of the robustness of the schedules.

In some embodiments, robustness evaluation module 105 receives, as inputs, a first or planned flight schedule 110 and a second or actual or test flight schedule 115. The planned flight schedule and the actual or test flight schedule may be transmitted to robustness evaluation module 105 from another device or system. In some aspects, planned flight schedule 110 and actual flight schedule 115 may be received by robustness evaluation module 105 from a database 125. Database 125 may be maintained, owned, or controlled by an airline, a government agency (e.g., an aviation regulatory agency), or a third-party service provider. In some instances, communication of the planned flight schedule 110 and actual flight schedule 115 from database 125 to robustness evaluation module 105 may be facilitated by communication device or interface 120. In some aspects, communication device 120 may be part of a system, sub-system, or device comprising robustness evaluation module 105, whereas it may be independent of robustness evaluation module 105 in some other embodiments.

In some aspects, the first or planned flight schedule 110 and the second or actual or test flight schedule inputs to robustness evaluation module 105 may each include details associated with each of the at least one flight comprising the planned flight schedule and the actual flight schedule. In some aspects, the details associated with the at least one flight include at least one of a flight number, a flight departure time, a flight arrival time, a flight departure airport, a flight arrival airport, an aircraft type for the at least one flight, flight crew details for the at least one flight, other specific information related to the flight including but not limited to desired city pairs, desired flight times, block times, aircraft assets, airports, airport gate assignments, ground crews, and flight crews, and combinations thereof These types of details or a subset of the details may be included for each flight in the planned and the actual airline schedules. As an example, a planned flight schedule and an actual or test flight schedule for a particular airline may include about 3,000 flights per day. Accordingly, the planned and actual flight schedules may be complex and well-suited for being developed, stored, and managed by database system 125. Database system 125 may comprise a relational database, a multi-dimensional database, an eXtendable Markup Language (XML) document, or any other data storage system storing structured and/or unstructured data. Database system 125 may comprise a distributed database system having data thereof distributed among several relational databases, multi-dimensional databases, and/or other data sources, an object oriented database, a hybrid database, and other types of database management systems including an in-memory database system that can be provided in the "cloud" and as a service, without limit or loss of generality.

Robustness evaluation module 105 may primarily execute or perform a process to evaluate a robustness of the first or planned flight schedule 110 received, in some embodiments, from communication device/interface 120. Robustness evaluation module 105 may operate to evaluate the robustness of the planned (i.e., first) flight schedule 110 based on one or more predefined key performance indicators (KPIs). An output 130 of robustness evaluation module 105 may include a quantitative representation of a value associated with the one or more KPIs associated with, assigned to, defined for, or specified for a flight schedule.

Robustness evaluation module 105 may perform an evaluation of a robustness of the planned flight schedule 110 (and other flight schedules, such as, for example, one or more test flight schedules). In some aspects, the robustness evaluation module performs a robustness analysis using a simulation-based model of airline operations (i.e., a "virtual airline") to evaluate the robustness of flight schedules input thereto. In some aspects, robustness evaluation module 105 may also be referred to as a "simulation" module herein.

In some aspects herein, robustness evaluation module 105, also referred to as a robustness analysis module, conducts a root cause analysis of airline flight schedules in an effort to determine airline or flight operation disturbances. As used herein, an airline or flight operation disturbance may be any event, occurrence, or scenario that impacts the actual execution of the schedule to cause a deviation from the planned flight schedule. The airline operation disturbance may typically occur on a day of or day before (i.e., proximate, near, or on) the operation of a flight. Some examples of airline operation disturbances include, but are not limited to, weather related delays or cancelations, passenger connection delays, flight crew related delays or cancelations, airport related delays or cancelations, aircraft related delays or cancelations, and other factors. Additionally, airline operation disturbances may comprise root cause(s) (e.g., a snow storm at a airline hub airport) that directly impact flight operations in a first instance at a particular segment or leg of a flight and propagation delay cause(s) that result due to propagation of root causes from upstream flights (e.g., a connecting downstream flight delayed at an east coast airport due to the delay of an upstream flight caused by a snow storm at the airline's midwest hub airport). In some embodiments herein, the root cause disturbances may be extracted by the root cause analysis process and used in evaluating a flight schedule (e.g., an actual flight schedule or a test flight schedule). The root cause disturbances are extracted and accounted for since the root cause disturbances may represent a "true" cause of the deviations in a flight schedule that result in an actual flight schedule varying from its planned flight schedule. In some aspects, the extracted root cause distributions may be stored or represented in a record, file, or other persistence 135.

In accordance with some aspects herein, robustness analysis module 105 may be operable to determine and use the root cause disturbances of airline operation disturbances. In some embodiments, robustness evaluation module 105 may be operable to at least consider and process the root cause disturbances of airline operation disturbances that may be generated by and/or provided thereto for processing.

In accordance with some embodiments herein, the robustness evaluation performed by module 105 is conducted using a simulation-based model method or process, with the identified root cause disturbances injected into the simulation. As used herein, robustness of a flight schedule refers to how fragile a schedule is (or is not) to an airline operation disturbance. The more robust a schedule, the more capacity the schedule has to absorb airline operation disturbances without deviating from the planned airline schedule (e.g., planned flight schedule 110). In some aspects, a robust schedule may include one or more recovery opportunities so that the flight schedule may absorb or recover from airline operation disturbances without deviating from a planned flight schedule (e.g., flight schedule 110). As referred to herein, an operation disruption recovery opportunity may be generally characterized by three key attributes. Namely, the attributes of duration of aircraft turn, time of day of aircraft turn, and location of aircraft turn. These three attributes may be built into an optimization module through the cost/reward functions for aircraft turns and flight connectivity. Also, recovery opportunity may be characterized by the number of spare aircraft in the system. In some aspects, one embodiment of the present disclosure may distribute spare aircraft across the network following the cost/reward objectives mentioned above so as to create recovery opportunity. Recovery opportunity and schedule robustness may be characterized by extra buffer time in aircraft turns and/or crew turns, which can be built into the model constraints.

Regarding the simulation-based method to evaluate the robustness, it is noted that embodiments herein may use an airline flight operation simulation that models a very detailed operation of the flights comprising the airline. For example, details of the flights may include all aspects of a flight, including but not be limited to, departure gate, taxi out, takeoff, cruising, landing, taxi in, arrival gate, airport traffic control, curfew, cockpit crews, cabin crews, ground crews, passengers in different service classes, and other aspects of the flight. Accordingly, the simulation may be referred to as a modeling of a virtual airline.

In some aspects, a set of robustness key performance indicators (KPIs) are generated from the robustness evaluation. An output of robustness evaluation module 105 may include a set of quantitative measures or metrics 130. Quantitative metrics 130 may provide an indication or representation of a value of the robustness of the particular input schedule evaluated by robustness evaluation module 105. The indication or representation of the value of the robustness of an input schedule may be expressed in terms of one or more KPIs 130. The KPIs may represent multiple factors, parameters, and considerations an airline (or other entity) values as important, insightful, or key indicators of performance of a flight schedule. In some aspects, the quantitative value of the representation of the robustness may include a scaled, a relative ranking, a normalized value, and other value formats. The KPIs may characterize the airline's performance related to on-time departure, on-time arrival, flight delays, flight cancellations, passenger satisfaction, cargo, revenue, and cost.

A record and/or a report including at least one of the delay input file and the KPI values may be generated, stored, and transmitted to other devices (e.g., a display), systems (e.g., a database management system or other data persistence), and services (e.g., a cloud based data visualization service used by airline administrators within an airline organization).

Figure 2:
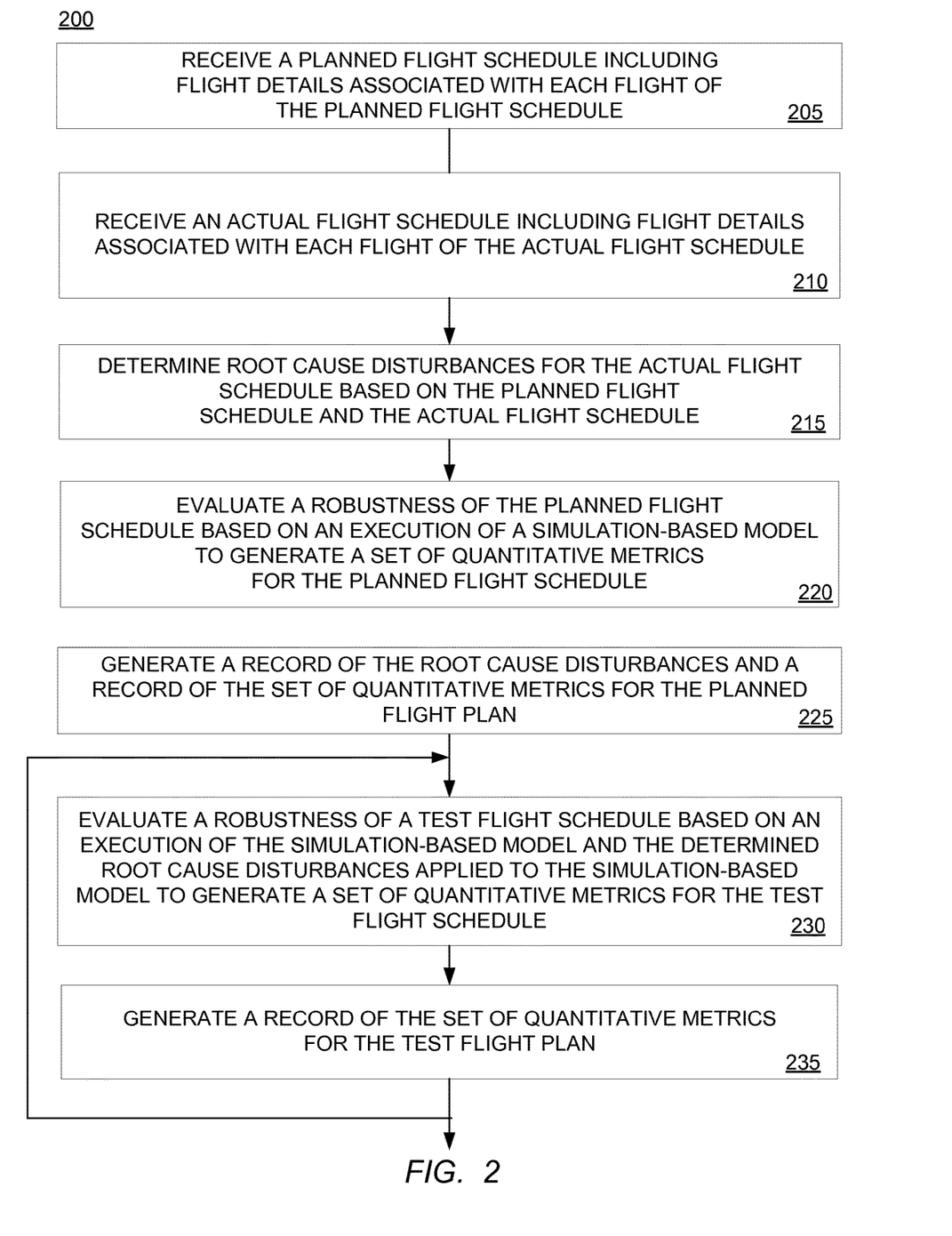
FIG. 2 is a depiction of a flow diagram, according to some embodiments.

In some aspects, system 100 and the process(es) performed thereby may be used to evaluate the robustness of planned and test schedules with regards to one or more robustness objectives and goals. FIG. 2 is an illustrative flow diagram of a process 200 that may be performed by a system, in accordance with some embodiments herein. In some aspects, system 100 may be used to implement at least some of the operations of process 200 shown in FIG. 2. In part, some details related to process 200 have been presented hereinabove in the introduction and discussion of system 100. Accordingly, while a complete discussion of FIG. 2 will now be disclosed below, certain details that may be repetitive in nature may not be repeated since they are already disclosed herein.

Referring to FIG. 2, a process related to providing a platform or framework for an evaluation of a robustness of flight schedule for airline flight operations is disclosed.

Process 200 may be implemented by a system, application, or apparatus configured to execute the operations of the process. In general, flow 200 relates to a process to efficiently (1) evaluate the robustness of flight schedules and (2) generate a set of KPIs that characterize the robustness of those flight schedules, where the evaluation is a quantitative evaluation. In some embodiments, various hardware elements of an apparatus, device or system embodying system 100 executes program instructions to perform process 200. As an example, the present disclosure provides a mechanism to quantify flight operation robustness. It may further enable airline network planners to compare an expected operation performance of a proposed flight schedule with baseline flight schedule performance. The present disclosure considers root cause analysis, root cause injection, and disturbance recovery when conducting robustness evaluation. In some embodiments, it captures the activities of airlines on or near their day of operation, and provides high-fidelity, quantitative metrics for schedule robustness and recovery benefits. The present disclosure may also be used for robustness testing under hypothetical disturbance scenarios.

In some embodiments, hard-wired circuitry may be used in place of, or in combination with, program instructions for implementation of processes according to some embodiments. Program instructions that can be executed by a system, device, or apparatus to implement process 200 (and other processes and sub-processes disclosed herein) may be stored on or otherwise embodied as non-transitory, tangible media. Embodiments are therefore not limited to any specific combination of hardware and software.

Prior to operation 205, applications or services executing on a device or system (not shown) such as, for example, a server-side computing device (e.g., an application server) of a distributed database system may be developed and deployed to develop, manage, and persist an airline schedule or plan, including planned flight schedules, actual flight schedules (i.e., historical details of actually executed flights comprising a flight schedule), and test (e.g., hypothetical) flight schedules. Process 200 may receive the flight schedules from the device or system. The development or planning phase of airline flight schedules may therefore be provided to process 200.

At operation 205, a planned airline flight schedule is received. The planned schedule may be received from a communication interface or device that may be integral to or separate from a device or system implementing process 200. In some aspects, the planned schedule may be previously planned flight schedule resulting from a planning process conducted many months (e.g., 6-9 months) in advance of an execution or implementation of the flight schedule or plan. The planned flight plan will include the specific details of each flight in the plan.

At operation 210, an actual airline flight schedule is received. The actual flight schedule may correspond to the planned flight schedule received at operation 205. Hereto, the actual flight plan may be received from a communication interface or device that may be integral to or separate from a device or system implementing process 200. In some instances, the actual flight plan may be sourced from a different location, system, or entity than the planned flight schedule. In some aspects, the actual flight schedule will include historically accurate representations of flight operation details resulting from an execution of the planned flight plan or at least portions thereof during a specific period of relevancy. The actual flight plan or schedule will include the specific details of each flight in the actual schedule, including, for example, historical departure and arrival times of the flights, cancelled flights, and flights added to or removed from the schedule during the actual, historical execution of the planned flight schedule.

At operation 215, a determination of root cause disturbances for the actual flight schedule is performed. The determination of operation 215 may be accomplished based on an analysis of both the planned flight schedule and the actual flight schedule. In some aspects, the root cause disturbances determined or calculated at operation 215 may reflect the actual causes of the deviations present in the actual flight schedule as compared to the planned flight schedule.

In some aspects, the determination of root cause disturbances may be executed by a root cause analysis module, device, or system (generally referred to herein as a root cause analysis (RCA) module). In some embodiments, the RCA module may be part of the robustness evaluation system 105 shown in FIG. 1. In some embodiments, the RCA module may be separate device or system that is distinct from the robustness evaluation system 105 shown in FIG. 1. The RCA may operate to determine flight disturbances that reflect root cause disturbances introduced on a particular flight leg and propagated flight disturbances that reflect disturbances introduced by flight legs earlier than the currently considered, particular flight leg. It is noted that the flight disturbances occur or would occur near and/or during a flight operation. The root cause analysis can use a simulation based method, a causal analysis based method, a heuristics based method, an analytics based method, or a combination of the aforementioned methods.

Continuing with process 200, operation 220 includes an evaluation of a robustness of the planned flight schedule. The evaluation of operation 220 may be accomplished by an execution of a simulation-based model method or process. The execution of the simulation-based model process may be used to evaluate the robustness of the planned schedule, wherein the evaluation considers the root cause disturbances to the flight plan that result in the actual flight plan. In some aspects, the execution of the simulation-based model process used to evaluate the robustness of the planned schedule may be performed by the robustness evaluation system 105 shown in FIG. 1. (also referred to herein as a "simulation run"). In some aspects, the simulation run can be single-threaded, multi-threaded, discrete event-based, or agent-based. The evaluation of operation 220 may further include the generation of a set of quantitative metrics for the planned flight schedule.

Operation 225 includes a generation of a record (e.g., 135) of the root cause disturbance determined at operation 215 and generation of a record (e.g., 130) of the determined or calculated set of quantitative measures or metrics of the performance (e.g., KPIs) of the planned flight schedule from the evaluation of operation 220. In some embodiments, the KPIs may include one or more indicators of flight on-time performance, a flight cancellation rate, flight recovery actions, passenger delay, passenger misconnection, crew delay, crew misconnection, number of standby or reserve crews used, and other measures. In some aspects, the generated records may comprise a data structure, a message, and a file that may be stored, transmitted, further processed, and output in a user-readable format (e.g., a report, a graph, a dashboard or other visualization, an audible report, etc.) In some aspects, the quantitative metrics may include one or more KPIs or factors deemed relevant and important indicators of an airline's performance. The KPIs may be determined based on a specification determined for a particular airline and/or operating scenario for the airline. In some embodiments, the KPIs may include multi-objective metrics of, for example, flight on-time performance, a flight cancellation rate, flight recovery actions, passenger delay, passenger misconnection, crew delay, crew misconnection, number of standby or reserve crews used, and other measures.

Process 200 further includes an operation 230. Operation 230 operates to provide an evaluation of a robustness of a test flight schedule, where the robustness evaluation thereof is based on an execution of the simulation-based model and the determined root cause disturbances applied to the simulation-based model to generate a set of quantitative metrics for the test flight schedule. In some embodiments, the determined or extracted root cause disturbances may be applied or injected to the simulation-based model at a flight-leg level of the flights comprising the flight schedule being evaluated or at various other stages of a flight. In another embodiment, the root cause disturbances may be applied or injected at an airport level or a geographical region, for a particular time duration.

In some aspects, the test flight schedule may be a baseline schedule. In some instances, the baseline schedule may be a published flight schedule having known flight details that have been shown to, historically, provide an acceptable level of performance. Operation 230 may be executed using the baseline schedule and the root cause disruptions earlier determined at operation 215 to generate a set of quantitative metrics or KPIs for the test flight. The set of KPIs thus obtained may be referred to herein as baseline KPIs. In another aspect, the test flight schedule may be a future flight schedule, and the user (or other entity) may want to evaluate its robustness. In a further another aspect, the test flight schedule may be a hypothetical or experimental flight schedule, and the user (or other entity) may want to use it to study the robustness of the airline network in general (e.g., for scenario analysis or stress testing, etc.).

At operation 235, a record including the set of quantitative metrics or KPIs generated for the test flight may be created, generated, or persisted. In some aspects, the record generated at operation 235 may include quantitative values that may be used as an evaluation benchmark, as compared to KPI values for other flight schedules.

Continuing from operation 235, process 200 may operate to provide an evaluation of a robustness of other test flight schedule(s) by returning to operation 230, where the other, additional test flight schedule(s) may be referred to as experimental, hypothetical, or test schedule(s). The robustness of the additional, other test schedule(s) may be evaluated at operation 230 based on an execution of the simulation-based model for the additional, other test flight schedule(s) and the determined root cause disturbances applied to the simulation-based model to generate a set of quantitative metrics for the test flight schedule(s), where the simulation-based model is executed for each new or different schedule comprising the additional, other test schedule(s).

In some instances, the additional, other test flight schedule(s) may be "what-if" schedules comprising a proposed schedule of flights. In this manner, running or executing the simulation-based model for the "what-if" flight schedule(s) may result in the obtaining or calculating of "experimental" KPIs corresponding to those "what-if" flight schedule(s).

In embodiments, the KPI metrics representing a measurement of the robustness of the test schedule(s), may be compared to the baseline KPI of the baseline schedule. In this manner, a relative measure of the robustness of the test schedule(s) may be determined with respect to the (known) baseline schedule.

In some aspects, the simulation-based model executed in some embodiments herein may also incorporate disturbance recovery solutions. As such, the determination of the KPIs may also provide a measure of or insight into the benefits of recovery under various disturbances. In some embodiment, the output multi-objective KPI metrics herein provide a quantitative measurement of the robustness of the test schedule(s), as compared to the baseline schedule and also quantifies the benefits of recovery operations.

In some embodiments, the determined or extracted root cause disturbances may be applied or injected to the simulation-based model at a flight-leg level of the flights comprising the flight schedule being evaluated or at various other stages of a flight.

Figure 3:
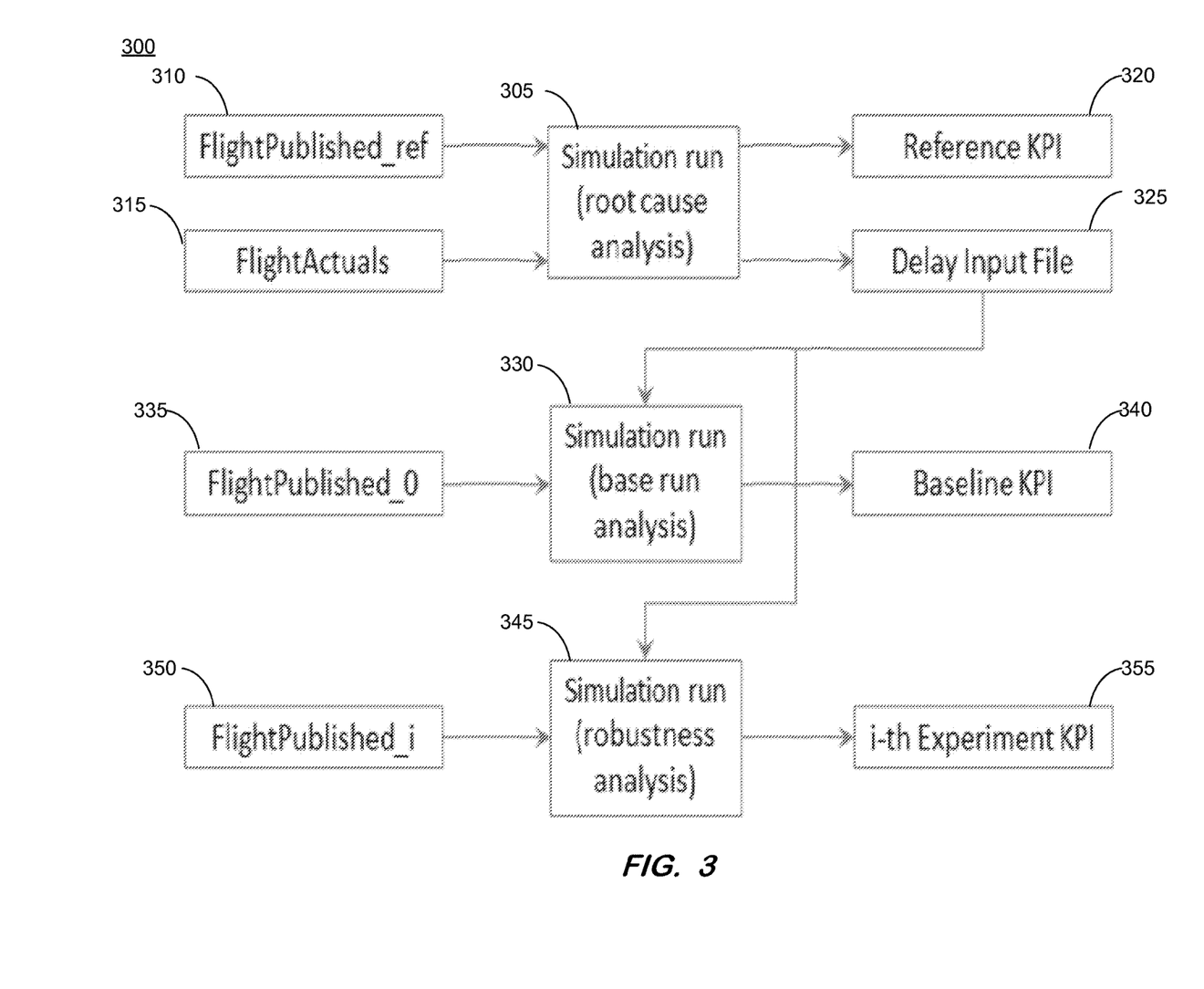
FIG. 3 is an illustrative depiction of a system, according to some embodiments.

FIG. 3 is an illustrative depiction of a logical block diagram of a computing device, system, or platform, in accordance with some embodiments. System 300 may be, for example, associated with devices for implementing the processes disclosed herein (e.g., process 200). Being a logical representation or an abstraction of a device, system, or platform, an actual implementation of system 300 is not limited to the specific configuration depicted in FIG. 3 and may include fewer, additional, alternative, and substitute components, arranged in varying configurations. For example, one or more devices and systems to facilitate communication and/or processing may be disposed between two or more components of FIG. 3, without loss of any generality within the scope herein.

As shown, system 300 includes a simulation-based model module 305. In some aspects, module 305 includes functionality for a root cause analysis (RCA) determination and functionality for a robustness evaluation. Inputs to simulation-based model module 305 include a planned flight schedule 310. Planned flight schedule 310 (i.e., FilghtPublished_ref) may correspond to a planned, published flight schedule that was developed and implemented by an airline and may serve as a reference schedule in the present example. Another input to simulation-based model module 305 includes actual flight data 315 corresponding to flights operated in fulfillment of the planned flight schedule 310. The actual flight schedule data 315 (i.e., FlightActuals) includes historical data of the flights operated in order to satisfy the schedule, including flights operated as planned, added flights, cancelled flights, delayed flights, and re-routed flights.

Simulation-based model module 305 may operate to determine the root cause disturbances by, in part, analyzing the inputs 310, 315 and other factors impacting the operation of the actual flights during the relevant periods of the planned schedule. Moreover, the RCA aspect(s) of simulation-based model module 305 may extract the root cause disturbances and generate a record thereof that is included in a delay input file 325. In some aspects, simulation-based model module 305 may operate to determine or evaluate the robustness of the planned flight schedule 310 based on multi-objective KPIs. Moreover, the KPIs of the planned schedule, as determined or calculated by simulation-based model module 305, may be included in a reference KPI record 320. In some regards, the root cause disturbances included in delay input file 325 account for and represent the true causes for the actual flights 315 deviating from the planned flight schedule 310.

Referring to FIG. 3, the root cause disturbances of delay input file 325 may be sent or transmitted to simulation-based model module 330. In some embodiments, simulation-based model module 330 may be the same as simulation-based model module 305. In some embodiments, simulation-based model module 330 may be another instance of simulation-based model module 305. Another input to simulation-based model module 330 includes a test flight schedule 335 (e.g., data comprising Flight_Published_0). This flight schedule may include a baseline schedule that may be used as a reference schedule in comparing its KPIs with other test flight schedules. Flight schedule 335 may be a test schedule, where the baseline flight schedule is a particular test schedule that may be used as a reference point for the evaluation and comparison of other test flight schedules.

Simulation-based model module 330 may operate to determine the root cause disturbances by, in part, analyzing the inputs 335 and 325 (and other factors of delay input file 325, if any) that would impact the operation of the flights of test schedule 335. In some aspects, simulation-based model module 330 may operate to determine or evaluate the robustness of the test flight schedule 335 based on multi-objective KPIs. Moreover, the KPIs of the test flight schedule, as determined or calculated by simulation-based model module 330, may be included in a baseline KPI record 340. In some regards, the root cause disturbances included in delay input file 325 may represent the historical disturbances and may be applied to the test flight schedule 335. The response of the test flight schedule 335 to the historical disturbances as represented delay input file 325 may be reflected in the baseline KPI record 340.

In some aspects, when historical (i.e., actual) disturbances comprises the delay input flight record 325 and the historical disturbances are injected into a simulation-based model 330 to evaluate a robustness of a test schedule 335, then the process of evaluating the test schedule(s) may be said to be "backwards looking" since the flight disturbances are derived from actual, historical data.

In some embodiments, further executions of the simulation-based model module, such as instance 350, may be executed for other, additional test flight schedules (e.g., FlightPublished_i) to generate KPIs calculated or determined in response to and based on the additional, other test schedules being subjected to the root cause disturbances included in delay input file 325, as applied by the simulation-based model module 350.

In some embodiments, an automated process may be executed that generates one or more test flight schedules to cover or encompass a range of operational scenarios. The operational scenarios may include one or more hypothetical situations or environments (i.e., not actual, historical events or environments even though the hypothetical situations or environments may, at least in part, be based on some historical data).

Figure 4:
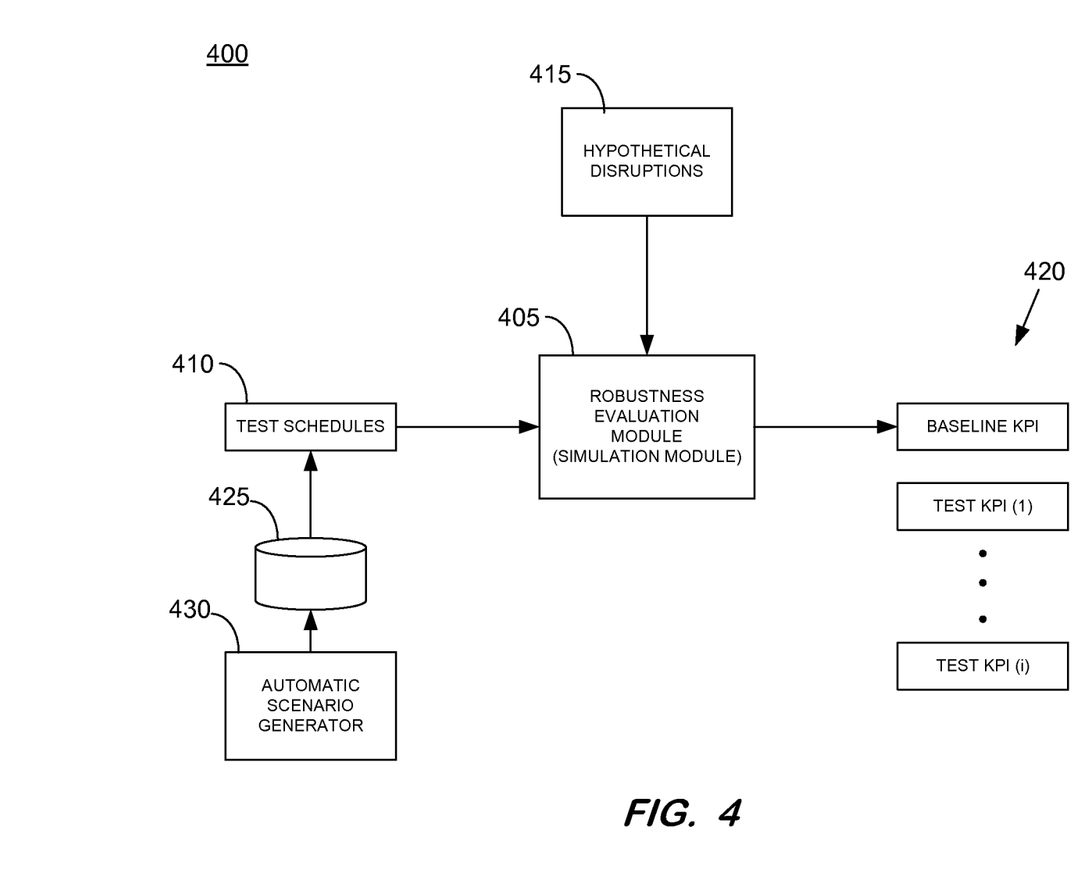
FIG. 4 is an illustrative depiction of a system, according to some embodiments.

FIG. 4 is a block diagram of a system, device, or platform 400 that may be used in a "forward looking" flight schedule robustness evaluation context. System 400 may include a simulation-based model module 405 that operates to run a (virtual) airline operations simulation. Inputs to the simulation-based model module 405 may include a test or proposed flight schedule 410 retrieved or obtained from a database or persistence layer 425. Additionally, hypothetical disruptions 415 may be "injected" into simulation-based model module 405. Applying the hypothetical disruptions to simulation-based model module 405 may have the effect of subjecting a proposed flight schedule 410 to the one or more root cause disturbances comprising the hypothetical disruptions 415. In some aspects, the output of the execution of simulation-based model module 405 based on proposed or test schedule 410 and the hypothetical disruptions 415 injected into the simulation represents KPIs 420 for the proposed flight schedule(s) 410. In some instances, values for KPIs 420 may be compared to a baseline or other KPIs for an airline or other entity running the proposed flight schedule 410 through the execution of the simulation-based model module. The baseline or other KPIs used as a basis of comparison for KPIs 420 may include an airline's own flight schedule KPIs, KPIs obtained from previous executions of the simulation-based model module 405, third-party service providers, and other entities. The KPIs 420 determined for a simulation run of FIG. 4 may be represented in a record (e.g., a data file, a report, etc.). In some embodiments, the record of KPIs 420 may be stored in a memory or other data store device, system, or persistence. In some embodiments, KPIs 420 may be stored in database 425 or another storage facility (not shown).

In some embodiments, such as the forward-looking evaluation processing system of FIG. 4, historical data, including root cause disturbances derived from real, historical data and actual flight schedules are not needed since the root cause disturbances determined for FIG. 4 do not depend on historical (i.e., actual) flight data.

In some embodiments, the hypothetical disruptions 415 of FIG. 4 may be manually generated and provided to system 400. In some embodiments, an automated process or system such as automatic scenario generator 440 may generate a plurality or set of test flight schedules to encompass and cover a desired range of scenarios for one or more proposed or test schedules. In some embodiments, a mechanism to automatically generate one or more scenarios may be provided by the use of some aspects of an inverse function. In general, for a system transfer function y=F(x), with an inverse function $F^{-1}$, one would expect that both $$\delta \to 0$$

$$\varepsilon \to 0$$

as the accuracy of the system improves, where $\delta$ and $\varepsilon$ are defined as:

$$\|F(F^{-1}(x))-x\|=\delta$$

$$\|F^{-1}(y))-y\|=\varepsilon$$

As an example, when developing performance based agreements, it may be critical to use historical maintenance data to develop an accurate forecast of future maintenance data. Also, detailed OEM knowledge about the degradation and repair of equipment may be incorporated in maintenance models so that the impact of alternate maintenance strategies may be evaluated. As such, instead of developing a simple forecast model of $$x_{future}=T(x_{history}),$$

two inverse transfer functions may be developed, where $$x_{future}=F(behaviorModel, \ldots)$$

$$behaviorModel=F^{-1}(x_{history}).$$

In some embodiments, an example of network planning and robustness evaluation may incorporate some of the foregoing aspects, as described below. Some embodiments of the present disclosure may receive an input of a proposed flight plan that is to be validated, and a set of historical flight schedules based upon which various test scenarios will be extracted. In some aspects, the historical flight schedules may comprise original (i.e., published) flight schedules and actual, historical flight schedules. As discussed hereinabove, root cause disturbances may be extracted from each pair of original schedule and actual schedule and historical KPIs may be derived from a simulation-based model analysis.

Furthermore, some embodiments may include analyzing the historical KPIs and using the results of such an analysis to define categories of representative test scenarios. In some instances, a mass density based method or a spatial distance based method can be used to identify relevant scenarios to form test categories. The associated root cause disturbances are grouped into representative test scenario categories accordingly. In some aspects, within each test scenario category, the set of historical KPIs together may establish baseline KPIs for the particular test scenario category. The KPIs may be multi-objective. In some instances, a multi-objective cost function based method may be used to establish an overall baseline performance. Also, within each test scenario category, the set of root cause disturbances may be transmitted to the simulation analysis for plan validation.

In some regards herein, a coverage analysis may be conducted for the determined or established test scenario categories. If the established categories cover all representative scenarios (of interest), then simulation-based evaluation of the test flight schedules may be commenced and executed. Otherwise, a request for more historical schedules from user or other entity may be undertaken in an effort to construct the missing test scenario categories.

In some aspects, the present disclosure provides systems and methods that can be used for backward-looking evaluation of schedule robustness and forward-looking evaluation of schedule robustness. Further still, the present disclosure includes systems and methods that can automate the process of generating various test scenarios, evaluating robustness, and validating the evaluation results.

In some aspects herein, the present disclosure uses a simulation-based method to evaluate the robustness of the flight plan for all scenario categories. For each category, various cases of root cause disturbances may be injected into the simulation to evaluate the test flight plan, where the simulation analysis provides robustness KPIs of the plan schedule.

In some aspects, for each test scenario category, the test KPIs are validated against an established baseline KPIs. The validation process may use methods of statistical analysis and pattern analysis to compare the KPIs. Validation results for all categories are generally reported. In some aspects, processes herein may also report statistically significant enhancement(s) in operation robustness of a test flight plan, in terms of improved KPI metrics.

In some aspects, a validation process herein may use pattern analysis and cluster analysis methods to identify and categorize the types of network structure of the underlying flight plan, based on KPIs and equipment utilization level. Validation results may be analyzed via valuation analysis to derive the revenue impact of the flight plan.

System 500 comprises a processor 505, such as one or more commercially available Central Processing Units (CPUs) in the form of one-chip microprocessors or a multi-core processor, coupled to a communication device 520 configured to communicate via a communication network (not shown in FIG. 5) to another device or system (e.g., an administrator device or a client device, not shown). System 500 may also include a cache 510, such as RAM memory modules. The system may further include an input device 515 (e.g., a touchscreen, mouse and/or keyboard to enter content) and an output device 525 (e.g., a touchscreen, a computer monitor to display, a LCD display).

Figure 5:
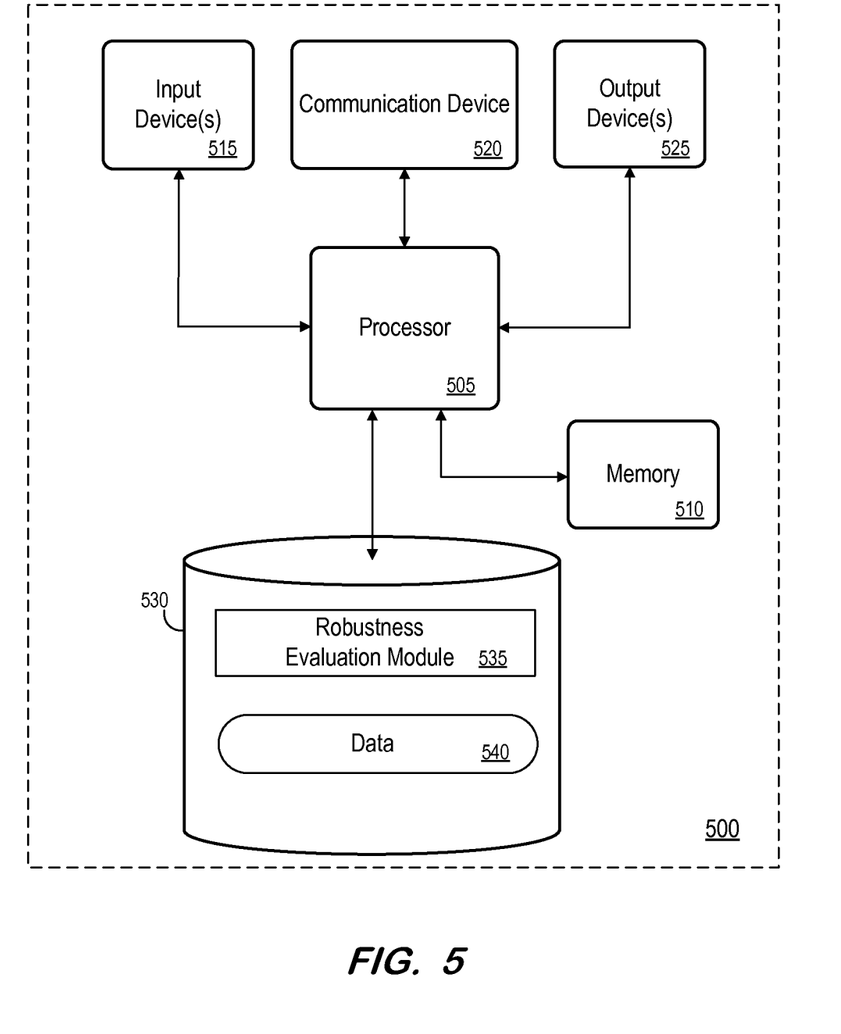
FIG. 5 is a block diagram of a validation system or platform, according to some embodiments.

Processor 505 communicates with a storage device 530. Storage device 530 may comprise any appropriate information storage device, including combinations of magnetic storage devices (e.g., a hard disk drive), optical storage devices, solid state drives, and/or semiconductor memory devices. In some embodiments, storage device 530 may comprise a database system, including in some configurations an in-memory database.

Storage device 530 may store program code or instructions to control an operation of database engine 535 to evaluate a robustness therein, in accordance with processes herein. Processor 505 may perform the instructions for implementing robustness evaluation module 535 to thereby operate in accordance with any of the embodiments described herein. Robustness evaluation module 535 may be stored in a compressed, uncompiled and/or encrypted format. Program instructions for robustness evaluation module 535 may furthermore include other program elements, such as an operating system, a database reporting system, and/or device drivers used by the processor 505 to interface with, for example, a client, an administrator, and peripheral devices (not shown in FIG. 5). Storage device 530 may also include data 540. Data 540 may be used by system 500, in some aspects, in performing one or more of the processes herein, including individual processes, individual operations of those processes, and combinations of the individual processes and the individual process operations. For example, data 540 may comprise a persistence layer of a database system and store baseline and test flight schedules, KPIs, etc., in accordance with some embodiments herein.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

As used herein, information may be "received" by or "transmitted" to, for example: (i) the platform 100 from another device; or (ii) a software application or module within the platform 100 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the figures illustrate aspects of the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). In some alternative implementations, the functions noted in a particular block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. Further, a computer program product can include a computer-readable storage medium with code adapted to be implemented to carry out one or more method steps described herein, including the provision of the system with the distinct software modules.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations. Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method implemented by a computing system in response to execution of program instructions by a processor of the computing system, the method comprising:
   receiving a planned flight schedule including flight details associated with each flight of the planned flight schedule;
   receiving an actual flight schedule including flight details associated with each flight of the actual flight schedule;
   determining root cause disturbances for the actual flight schedule based on the planned flight schedule and the actual flight schedule;
   evaluating a robustness of the planned flight schedule based on an execution of a simulation-based model wherein the evaluation applies the root cause disturbances to the planned flight plan to that result in the actual flight plan, the evaluation further including a generation of a set of quantitative metrics for the planned flight schedule;
   generating a record of the root cause disturbances and a record of the set of quantitative metrics for the planned flight plan;
   evaluating a robustness of each of a plurality of schedules in a set of test flight schedules based on an eecution of a simulation-based model for each test flight schedule and the determined root cause disturbances applied to the execution of the simulation-based model for each test flight schedule to generate a set of quantitative metrics for each of the plurality of test flight schedules in the set of test flight schedules;
   generting a record of the set of quantitative metrics for each of the plurality of test flight schedules in the set of test flight schedules;
   identifying and implementing recovery opportunities to absorb airline operational disturbances without deviating from the planned flight schedule;
   determining a relative robustness of each of the plurality of test flight schedules based on a comparison of the record of the set of quantitative metrics for each of the plurality of test flight schedules relative to the record of the set of quantitative metrics for a first test flight schedule in the set of test flight schedules,
   the simulation-based model includes a modeling of a virtual airline which models a detailed operation of the flights comprising the airline including departure gate, taxi out, takeoff, cruising, landing, taxi in, arrival gate, airport traffic control, curfew, cockpit crews, cabin crews, ground crews, passengers in different service classes; and
   operating flight recovery actions based on the flight recovery opportunities.

2. The method of claim 1, wherein the determining of the root cause disturbances for the actual flight schedule comprises executing a root cause analysis based on the planned flight schedule and the actual flight schedule.

3. The method of claim 2, wherein the execution of the simulation-based model comprises executing the root cause analysis, at least in part.

4. The method of claim 1, wherein the execution of the simulation-based model quantifies the robustness of the planned flight schedule based on at least one key performance indicator, wherein the at least one key performance indicator includes one or more of flight on-time performance, flight cancellation rate, flight recovery actions, passenger delay, passenger misconnection, crew delay, crew misconnection, number of standby or reserve crews used, and other measures.

5. The method of claim 1, wherein the set of test flight schedules is automatically generated and includes a portfolio of different flight operation scenarios.

6. A non-transitory, computer-readable medium storing instructions that, when executed by a computer processor, cause the computer processor to perform a method associated with the evaluation of the robustness of a network plan or flight schedule, the medium comprising program instructions executable by the computer processor to:
   receive a planned flight schedule including flight details associated with each flight of the planned flight schedule;
   receive an actual flight schedule including flight details associated with each flight of the actual flight schedule;
   determine root cause disturbances for the actual flight schedule based on the planned flight schedule and the actual flight schedule;
   evaluate a robustness of the planned flight schedule based on an execution of a simulation-based model wherein the evaluation applies the root cause disturbances to the planned flight schedule to result in the actual flight schedule, the evaluation further including a generation of a set of quantitative metrics for the planned flight schedule;
   generate a record of the root cause disturbances and a record of the set of quantitative metrics for the planned flight plan;
   evaluate a robustness of each of a plurality of schedules in a set of test flight schedules based on an execution of a simulation-based model of each test flight schedule and the determined root cause disturbances applied to the execution of the simulation-based model of each test flight schedule to generate a set of quantitative metrics for each of the plurality of test flight schedules in the set of test flight schedules;

generate a record of the set of quantitative metrics for each of the plurality of test flight schedules in the set of tests flight schedules;

identify and implement recovery opportunities to absorb airline operational disturbances without deviating from the planned flight schedule;

determine a relative robustness of each of the plurality of test flight schedules based on a comparison of the record of the set of quantitative metrics for each of the plurality of test flight schedules relative to the record of the set of quantitative metrics for a first test flight schedule in the set of test flight schedules, the simulation-based model includes a modeling of a virtual airline which models a detailed operation of the flights comprising the airline including departure gate, taxi out, takeoff, cruising, landing, taxi in, arrival gate, airport traffic control, curfew, cockpit crews, cabin crews, ground crews, passengers in different service classes; and operating flight recovery actions based on the flight recovery opportunities.

7. The medium of claim 6, wherein the determining of the root cause disturbances for the actual flight schedule comprises executing a root cause analysis based on the planned flight schedule and the actual flight schedule.

8. The medium of claim 6, wherein the execution of the simulation-based model comprises executing the root cause analysis, at least in part.

9. The medium of claim 6, wherein the execution of the simulation-based model quantifies the robustness of the planned flight schedule based on at least one key performance indicator, wherein the at least one key performance indicator includes one or more of flight on-time performance, flight cancellation rate, flight recovery actions, passenger delay, passenger misconnection, crew delay, crew misconnection, number of standby or reserve crews used, and other measures.

10. The medium of claim 6, wherein the set of test flight schedules is automatically generated and includes a portfolio of different flight operation scenarios.

* * * * *